Oct. 4, 1927.
L. C. PETERS
1,644,488
SPROUT WASHING MACHINE
Filed Aug. 18, 1925
2 Sheets-Sheet 1
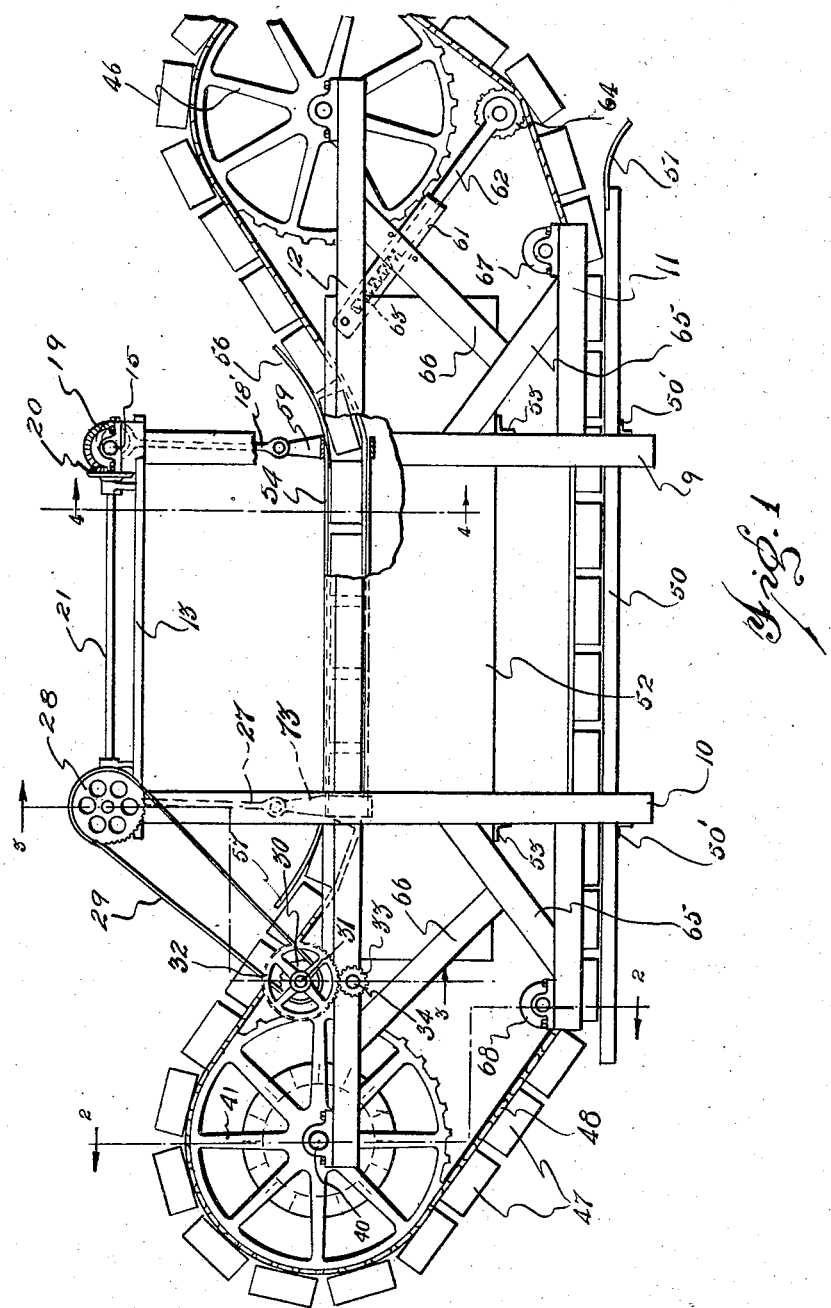
INVENTOR
Lewis C. Peters
ATTORNEY

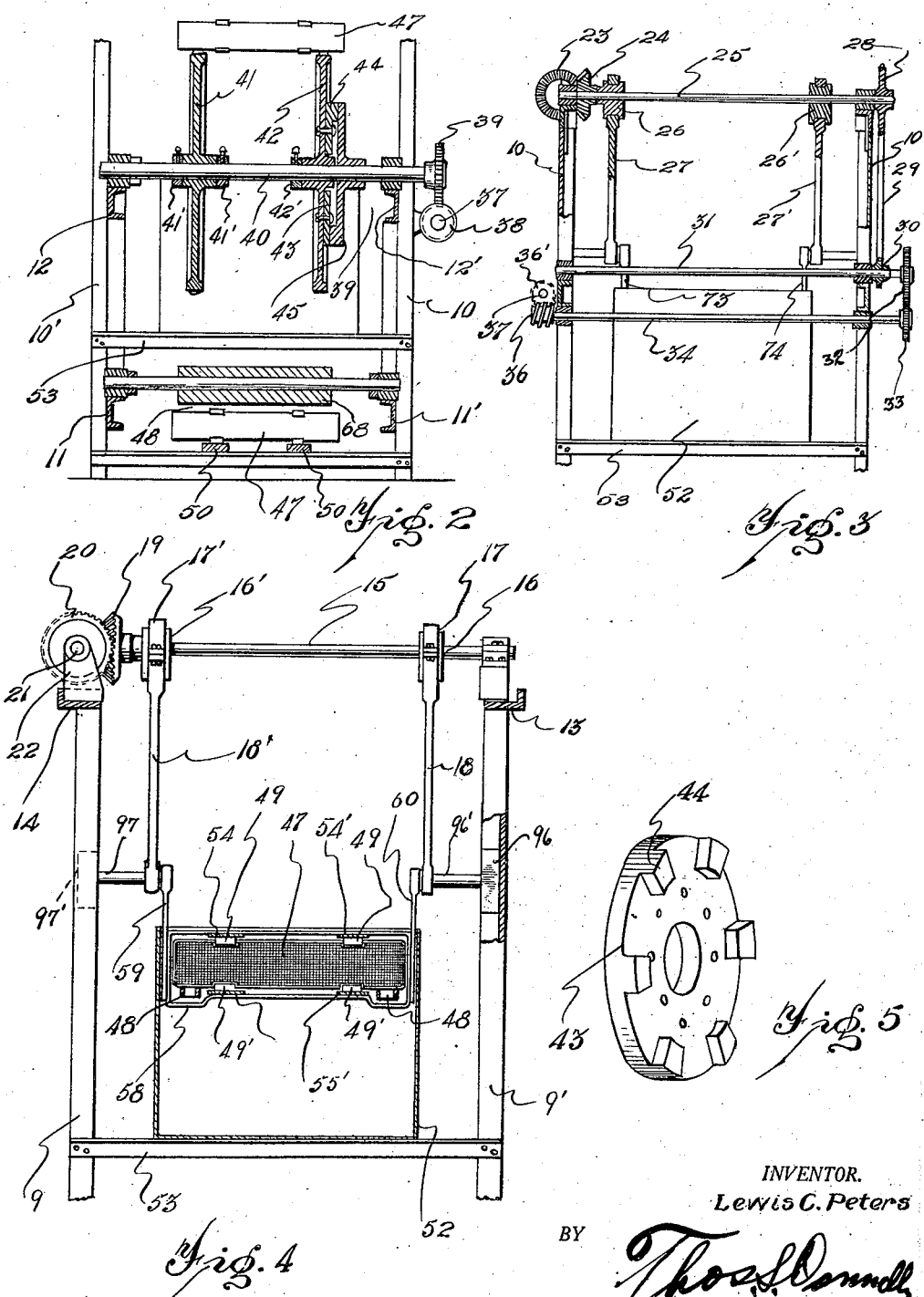

Patented Oct. 4, 1927.

1,644,488

UNITED STATES PATENT OFFICE.

LEWIS C. PETERS, OF HIGHLAND PARK, MICHIGAN, ASSIGNOR TO LA CHOY FOOD PRODUCTS, INC., A CORPORATION OF MICHIGAN.

SPROUT-WASHING MACHINE.

Application filed August 18, 1925. Serial No. 51,063.

My invention relates to a new and useful improvement in a sprout washing machine, adapted for use in washing sprouts to remove the hull therefrom. One kind of sprouts referred to, which are extensively used, are termed "Chinese sprouts" and are used principally in making chop suey and other Chinese dishes. These sprouts are obtained by placing a small Chinese pea under favorable conditions for germinating and permitting the germination to proceed until the sprout has obtained the desired length. The sprouts, in their best condition, are uncolored and free from stain. In commercializing these sprouts, it is desirable that they be canned and glass containers are generally used for canning purposes. However, whether or not the sprouts are canned in cans or glass containers, it is desirable that the green hull be removed from the sprout, so as not to impair the appearance of the sprouts themselves and present a marketable article. The most practical way that has, as yet, been devised for removing the hulls from the sprouts is by washing. Since these sprouts intertwine themselves among each other, merely immersing the sprouts in the water, will not effect a removal of all of the hulls. This is due to the fact that some of the hulls will float and some of them will not. The present invention is designed to provide a means for removing the hulls from the sprouts and to this end, it involves an immersion of the sprouts in water and an agitation of the sprouts while in the water, so that the hulls are removed from the body of the intertwined sprouts and the sprouts themselves entirely freed from the hulls.

It is an object of the present invention to provide a machine which embodies a conveyor adapted for conveying the sprouts with the hulls therein through a tank of water and having means for moving the conveyor longitudinally and agitating it vertically in the tank of water.

Another object of the invention is to provide means for permitting a slack to enter the conveyor and for taking up the slack at the proper times.

Another object of the invention is the provision of a guide frame for the baskets, which will permit the longitudinal travel of the conveyor and at the same time effect the vertical movement of the conveyor, so that the agitating in the tank of water may take place.

Another object of the invention is the provision of a reciprocal roller, adapted for retaining the conveyor in taut condition on the moving mechanism.

Other objects will appear hereinafter.

The invention consists in the combination and arrangement of parts hereinafter described and claimed.

The invention will be best understood from a reference to the accompanying drawings which form a part of this specification and in which Fig. 1 is a side elevational view of the invention, with parts broken away, Fig. 2 is a sectional view taken on substantially line 2—2 of Fig. 1, Fig. 3 is a sectional view taken on substantially line 3—3 of Fig. 1, Fig. 4 is a sectional view taken on substantially line 4—4 of Fig. 1, Fig. 5 is a perspective view of a disc used in the invention.

As shown in the drawings, the device comprises a supporting frame embodying uprights 9 and 9′ and 10′ and 10 positioned opposite each other, intermediate the ends of longitudinally extending rails 11 and 11′ and 12 and 12′. As shown in the drawings, the uprights are connected at their upper ends by longitudinally extending rails 13 and 14. Journaled in suitable bearings mounted on the uprights 9 and 9′ is a shaft 15, which extends transversely of the frame. Fixedly mounted upon the shaft 15, in spaced relation to each other, are eccentrics 16 and 16′, upon each of which is mounted eccentric straps 17 and 17′ respectively, each carrying a pitman 18 and 18′ respectively. Mounted upon the shaft 15 and adapted to rotate therewith is a miter gear 19, meshing with a miter gear 20, fixedly mounted upon a shaft 21, which is journaled in a bracket 22. On the opposite end of the shaft 21 is mounted a miter gear 23, which meshes with a miter gear 24 fixedly mounted upon a shaft 25 journaled in suitable bearings supported by the uprights 10 and 10′, said shaft 25 extending transversely of the frame. Eccentrics 26 and 26' are fixedly mounted upon the shaft 25 and connected to the pitmen 27 and 27' by means of the eccentric straps. Mounted upon the shaft 25 is a sprocket wheel 28, which is connected, by means of the sprocket chain 29, to a sprocket wheel 30, fixedly mounted upon the shaft 31. Mounted upon the shaft 31 is a gear wheel 32, adapted to mesh with the gear wheel 33, fixedly mounted upon the shaft 34. A gear 36 is mounted on the shaft 34 and adapted to mesh with the gear 36', which is mounted on the shaft 37, at one end. The opposite end of the shaft 37 carries a worm 38, forming with the worm gear 39 a worm gearing adapted to effect a rotation of the shaft 40.

Rotatably mounted upon the shaft 40 are comparatively large sprocket wheels 41 and 42, prevented by collars 41' and 42' from moving longitudinally on the shaft 40. Secured to one face of the wheel 42 is a disc 43 having projections 44 formed on its face, adapted to co-operate with similar projections formed on the meeting face of a disc 45, which is fixedly mounted upon the shaft 40. Journalled in suitable bearings on the longitudinally extending rails 12 and 12' at the opposite end of the frame, are wheels 46. As clearly seen in Fig. 1, a conveyor is adapted to embrace the wheels 46 and the wheels 41 and 42, this conveyor comprising a plurality of baskets 47 made from wire woven into a fine mesh, and mounted upon a pair of sprocket chains 48. Each of the baskets 47 is provided, as shown in Fig. 4, with rollers 49 at their upper edge, and rollers 49' at their lower portion. Longitudinally extending guide rails 50 are supported by cross members 50', which are secured to the uprights 9 and 9' and 10 and 10'. A tank 52 is provided which, when the device is in operation, is filled with water, this tank being supported by cross members 53, which serve to connect the uprights 10 and 10' and the uprights 9 and 9'. An immersing frame is provided, comprising longitudinally extending straps 54 and 54' and 55 and 55'. As seen in Fig. 4, these straps are connected by embracing bands 58, which are spaced at intervals along the straps 54 and 54' and the straps 55 and 55'. The space between the straps 54 and 55 and the straps 54' and 55' is such as to permit the passage of the baskets 47 therethrough, the rollers 49 and 49' engaging these straps, as shown in Fig. 4. As shown in Fig. 1, the ends 56 and 57 of the straps 54 and 54' are turned outwardly so as to provide a guide for the baskets 47 when entering the frame and reducing the vibration of the baskets 47 when proceeding from the frame. Connected to the immersing frame are arms 59 and 60, 73 and 74, as clearly seen in Fig. 3 and Fig. 4. The arm 59 is connected to the pitman 18' and the arm 60 is connected to the pitman 18. The arm 73 is connected to the pitman 37 and the arm 74 is connected to the pitman 27'.

The shaft 34 is connected to a suitable source of power, which effects a rotation of this shaft 34. As the shaft 34 rotates through the connections, the shafts 25 and 15 are set in rotation, as is also the shaft 40. The rotation of the shaft 40 effects a rotation of the gears 41 and 42, which mesh with the sprocket chain 48, upon which the baskets 47 are mounted, this rotation of the wheels 41 and 42 causing a travel of the conveyor formed from the sprocket chain 48 and the baskets 47. As the baskets 47 pass over the wheels 41 and 42, the sprouts are deposited in the baskets. The rotation of the wheels 41 and 42 will then cause the baskets to travel into engagement with the upwardly turned ends 57 of the immersing frame and a further travel of the conveyor will bring the baskets within the immersing frame. The shafts 15 and 25 being in rotation will cause a vertical reciprocal movement of the immersing frame, this frame being positioned sufficiently within the tank 52 to cause the baskets to be immersed in water, when in the immersing frame. As the conveyor is traveling around and the immersing frame is at its elevated position, the conveyor will be kept taut by a gear 64 which is mounted upon an arm 62 slidably mounted in a sleeve 61, the spring 63 which is positioned behind the arm 62 in the sleeve 61 serving to effect an outward thrust on the roller 64. The disc 45 effects a rotation of the shaft 40 on account of the engagement of its projections with the projections 44 on the disc 43. When the immersing frame starts on its downward movement, the conveyor will move about the wheels 41 and 42 more rapidly than when the immersing frame is at its elevated position, thus causing the projections 44 on the disc 43 to move away from the projections on the disc 45. The disc 45 will rotate at a constant speed, so that it will alternately be effecting a rotation of the wheel 42 and alternately riding idle. The movement, therefore, given to the conveyor is a spasmodic movement, the conveyor moving rapidly for a short space, hesitating, then moving along more slowly, and then again making a rapid movement, the portion of the conveyor which is passing through the immersing frame being moved rapidly vertically so as to splash the water which is in the tank 52 through and around the baskets contained within the immersing frame. In use, a stream of water will be kept flowing into the tank 52, so that as the hulls are washed free from the sprouts, those which float are carried over the sides of the tank to a suitable drain positioned in the floor. Those which do not float will be deposited in the tank 52. The movement of the baskets in the tank will cause a thorough washing of the sprouts as the water will be forced through the sprouts, first in one direction and then in the other direction. In this manner the hulls are drawn from among the sprouts.

As the conveyor goes through these various movements, the arm 62 carrying the sprocket wheel 64 is reciprocated. When the baskets proceed from the immersing frame and travel over the wheels 46, the baskets 47 are inverted and a suitable container may be positioned to receive the sprouts when falling from the baskets 47. Suitable braces 65 and 66 are provided, to lend rigidity to the frame. Rollers 67 and 68 are provided for engaging the conveyor, the end 51 of the rails 50 being angularly turned to provide a ready entry of the baskets in the space provided. The angularly turned portion 56 serves to engage the baskets 47 and prevent vibration of the same when emerging from the immersing frame, so that a jarring of the sprouts out of the baskets 47 is prevented.

The structure of the machine is a durable one and quite effective for the purposes intended. It will be noted that the conveyor at that portion which is contained within the immersing frame is continually traveling longitudinally of the frame, while, at the same time, the baskets and the frame are being reciprocated vertically, the structure of the machine being such as to permit this movement.

While I have illustrated and described the preferred form of structure, I do not wish to limit myself to the precise form of structure shown but desire to avail myself of such variations and modifications as come within the scope of the appended claims.

Having thus described my invention, what I claim as new and desire to secure by Letters Patent is:

1. A spout-washing machine of the class described, comprising an immersing tank; an immersing frame; a bucket conveyor adapted for traveling longitudinally through said frame; means for driving said conveyor; means for oscillating said immersing frame in said tank; and means for compensating for the movement of said conveyor relatively to the driving means for retaining said conveyor in operative position on said driving means at all times.

2. A washing machine of the class described, comprising an immersing tank; an endless traveling conveyor for conveying material over said tank; and means for forcing a portion of said conveyor over said tank upwardly and downwardly in said tank during the lineal travel of said conveyor for effecting an immersing of said material in said tank.

3. A washing machine of the class described, comprising an immersing tank; a conveyor for conveying material over said tank; a vertical reciprocal frame for guiding said conveyor over said tank; and means for reciprocating said frame for effecting a vertical movement of a portion of said conveyor in said tank during the travel of said conveyor for effecting a periodic immersing of said material in said tank.

4. A sprout-washing machine of the class described comprising an immersing tank filled with water; a conveyor for conveying sprouts over said tank; means for driving said conveyor; means for vertically moving a portion of said conveyor upwardly and downwardly in said water for washing said sprouts during the travel of said container in response to said driving means; and means for compensating for the vertical movement of said portion of said conveyor for retaining said conveyor in taut condition at all times.

5. A sprout-washing machine of the class described comprising a conveyor; an immersing tank; means for driving said conveyor for conveying sprouts from said tank; means for moving a portion of said conveyor upwardly and downwardly in said tank during the travel of said conveyor, said driving means being inoperative upon downward movement of said conveyor into said tank.

6. A sprout-washing machine of the class described comprising an immersing tank full of water; a conveyor for conveying sprouts over said tank; means for moving a portion of said conveyor vertically relatively to said tank during the travel of said conveyor; means for driving said conveyor, said means racing during the downward movement of said conveyor into said tank and being retarded upon the upward movement of said conveyor relatively to said tank.

7. A sprout-washing machine of the class described, comprising an immersing tank full of water; an endless conveyor passing above and below said tank for conveying sprouts from said tank; means adjacent one end of said tank for driving said conveyor; reciprocal means for moving a portion of said conveyor during its travel upwardly and downwardly in said tank for effecting a washing of said sprouts, said driving means moving constantly during the travel of said conveyor and alternately idling and operating during the vertical movement of said conveyor relatively to said tank.

In testimony whereof I have signed the foregoing specification.

LEWIS C. PETERS.